(12) United States Patent
Ray et al.

(10) Patent No.: US 8,900,339 B2
(45) Date of Patent: Dec. 2, 2014

(54) FILTERS, SYSTEMS AND METHODS FOR REDUCING CAN VELOCITY

(75) Inventors: Andrew Alan Ray, Raytown, MO (US); Martin Gregory Hatfield, Lee's Summit, MO (US)

(73) Assignee: BHA Altair, LLC, Franklin, TN (US)

( * ) Notice: Subject to any disclaimer, the term of this patent is extended or adjusted under 35 U.S.C. 154(b) by 353 days.

(21) Appl. No.: 13/274,997

(22) Filed: Oct. 17, 2011

(65) Prior Publication Data
US 2013/0092642 A1    Apr. 18, 2013

(51) Int. Cl.
B01D 46/00    (2006.01)
B01D 46/10    (2006.01)
B01D 46/24    (2006.01)
B01D 46/52    (2006.01)

(52) U.S. Cl.
CPC .......... *B01D 46/521* (2013.01); *B01D 46/2411* (2013.01); *Y10S 210/17* (2013.01)
USPC ................ 55/521; 55/459.1; 55/482; 55/498; 55/501; 55/502; 55/503; 55/337; 210/282; 210/493.1; 210/493.2; 210/485; 210/DIG. 17

(58) Field of Classification Search
USPC ........ 55/459.1, 482, 498, 501, 502, 503, 337, 55/521; 210/282, 493.2, 493.1, 485, 210/DIG. 17
See application file for complete search history.

(56) References Cited

U.S. PATENT DOCUMENTS

| 4,365,980 | A | * | 12/1982 | Culbert et al. | .................. | 55/315 |
|---|---|---|---|---|---|---|
| 4,498,915 | A | * | 2/1985 | Witchell | .......................... | 55/498 |
| 5,916,435 | A | | 6/1999 | Spearman et al. | | |
| 5,954,848 | A | | 9/1999 | Otto | | |
| 7,524,349 | B2 | * | 4/2009 | Schrage et al. | ................. | 55/502 |
| 7,662,203 | B2 | | 2/2010 | Scott et al. | | |
| 7,988,757 | B2 | * | 8/2011 | Scott et al. | ...................... | 55/498 |
| 2002/0040569 | A1 | | 4/2002 | Reinhold | | |
| 2006/0086075 | A1 | * | 4/2006 | Scott et al. | ...................... | 55/498 |
| 2012/0180444 | A1 | * | 7/2012 | Nikolin et al. | .................. | 55/498 |
| 2012/0186452 | A1 | * | 7/2012 | Smithies et al. | ..................... | 96/9 |
| 2013/0269302 | A1 | * | 10/2013 | Scott et al. | ...................... | 55/510 |

FOREIGN PATENT DOCUMENTS

| DE | 4211752 A1 | 10/1993 |
|---|---|---|
| WO | 2005082484 A1 | 9/2005 |
| WO | 2006119414 A1 | 11/2006 |

OTHER PUBLICATIONS

Search Report from corresponding GB Application No. 1218028.7, dated Feb. 11, 2013.

* cited by examiner

*Primary Examiner* — Robert Clemente
*Assistant Examiner* — Minh-Chau Pham
(74) *Attorney, Agent, or Firm* — Reinhart Boerner Van Deuren P.C.

(57) ABSTRACT

Certain embodiments of the invention may include filters, systems, and methods for reducing can velocity. According to an example embodiment, a filter is provided for filtering particles from air or fluid. The filter includes a first end and a second end, wherein the first end includes an aperture; one or more sections of pleated filter media including a plurality of pleats formed in a substantially conical shape about an axis and around an inner void region in communication with the aperture, wherein a diameter associated with the first end aperture is greater than a diameter associated with the second end; and one or more radial support regions in circumferential contact with at least one of an outer surface of the filter media, wherein spacing of at least some of the plurality of pleats are maintained at least in part by the one or more radial support regions.

16 Claims, 5 Drawing Sheets

FILTERS, SYSTEMS AND METHODS FOR REDUCING CAN VELOCITY

FIELD OF THE INVENTION

This invention generally relates to filters, and in particular, to filters, systems, and methods for reducing can velocity.

BACKGROUND OF THE INVENTION

Filters made with pleated materials are often used in many industrial filtering applications for removing particles or contaminants from a gas or liquid stream. Pleated filter materials may also be utilized to minimize the pressure drop across the filter media during the filtering process. Some filter housings utilize multiple filter cartridge arrays to increase the volume of gas or liquid that can be filtered per unit of time. However, the spacing between the filter cartridges is often minimized, and in certain circumstances, the air velocity around the cartridge (often referred to as the can velocity) can be high due to the restricted volume between cartridges. Such high can velocities can create problems with the filters, including degrading, delaminating, and/or collapsing the pleated filter material, or causing uneven filtration over the surface of the pleated material.

BRIEF SUMMARY OF THE INVENTION

Some or all of the above needs may be addressed by certain embodiments of the invention. Certain embodiments of the invention may include filters, systems, and methods for reducing can velocity.

According to an example embodiment of the invention, a method is provided for filtering particles. The method includes providing one or more filter structures having a first end and a second end, wherein the first end comprises an aperture, and wherein the one or more filter structures comprise one or more sections of pleated filter media comprising a plurality of pleats and formed around an inner void region in communication with the aperture, and wherein a diameter associated with the first end aperture is greater than a diameter associated with the second end; providing one or more radial support regions in circumferential contact with at least one of an outer surface of the filter media, wherein spacing of at least some of the plurality of pleats are maintained at least in part by the one or more radial support regions; and drawing gas or fluid through the one or more filter structures.

According to another example embodiment, a filter is provided for filtering particles from air or fluid. The filter includes a first end and a second end, wherein the first end includes an aperture; one or more sections of pleated filter media including a plurality of pleats formed in a substantially conical shape about an axis and around an inner void region in communication with the aperture, wherein a diameter associated with the first end aperture is greater than a diameter associated with the second end; and one or more radial support regions in circumferential contact with at least one of an outer surface of the filter media, wherein spacing of at least some of the plurality of pleats are maintained at least in part by the one or more radial support regions.

According to another example embodiment, a filtration system is provided. The system includes: a filter house operable to receive a fluid or gas flow to be filtered; and a plurality of filter cartridges having a first end and a second end, wherein the first end includes an aperture and the second end comprises an end cap. The plurality of filter cartridges further include one or more sections of pleated filter media having a plurality of pleats formed in a substantially conical shape about an axis and around an inner void region in communication with the aperture, wherein a diameter associated with the first end aperture is greater than a diameter associated with the second end, and wherein the filter media is secured to the end cap. The plurality of filter cartridges further include one or more radial support regions in circumferential contact with at least one of an outer surface of the filter media, wherein spacing of at least some of the plurality of pleats are maintained at least in part by the one or more radial support regions.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Certain embodiments of the invention may be utilized to reduce air velocity near filters. According to certain example embodiments, filters may be made with a tapered shape. According to an example embodiment, the tapered shape may help maximize the volume usage within a filter baghouse. According to an example embodiment, the tapered shape may help provide a larger volume between filter cartridges to reduce air velocities (or can velocities) around the cartridges. In an example embodiment, the tapered shape may allow air interact evenly with the filter material. Various parts and designs for making the tapered filter will now be described with reference to the accompanying figures.

Figure 1:
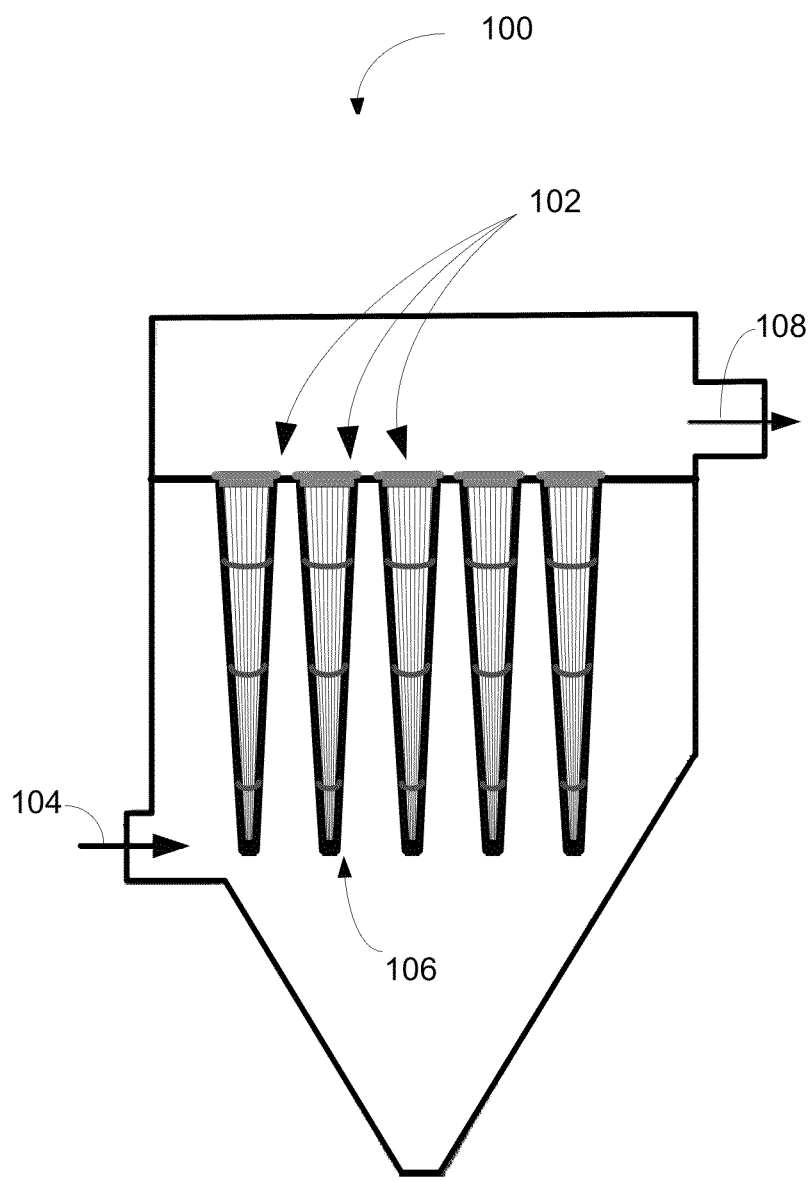
FIG. 1 is a block diagram of an illustrative filter house according to an example embodiment of the invention.

FIG. 1 illustrates an example filter house 100, according to an example embodiment, for which embodiments of the invention may be utilized. For example, the filter house 100 may include an array of filter cartridges 102. In an example embodiment, un-filtered air 104 may enter the filter house 100 via an unfiltered air plenum 106 in communication with at least one side of the filter cartridges 102 (in this case, for example, an exterior side). In an example embodiment, impurities may be removed from the input air 104 air passing through the filter cartridges 102, and the clean air on the interior part of the filter cartridges 102 may travel through a clean air plenum 108. In an example embodiment, the unfiltered air plenum 106 and the clean air plenum 108 are separated by the filter media so that unfiltered air 104 passes through the filter cartridges 102 to enter the clean air plenum 108.

FIG. 1 depicts a filter house having an array of cartridges 102, in accordance with an embodiment of the invention. The filter cartridges 102 are generally elongated and may be arranged parallel (e.g., along axes of elongation) to each other in a substantially vertical manner. It can be appreciated that the filter cartridges may have lengths, widths, and profile shapes that differ dependent upon desired configurations.

According to example embodiments, the filter cartridges 102 may be capable of filtering air to remove a variety of impurities. For instance, the filter cartridges 102 may be used, but are not limited, to filter hot gas(es). In addition, example embodiments of the filter cartridges 102 may be used in applications in environments that may have gas streams or dust that are relatively acidic or alkaline.

Figure 2:
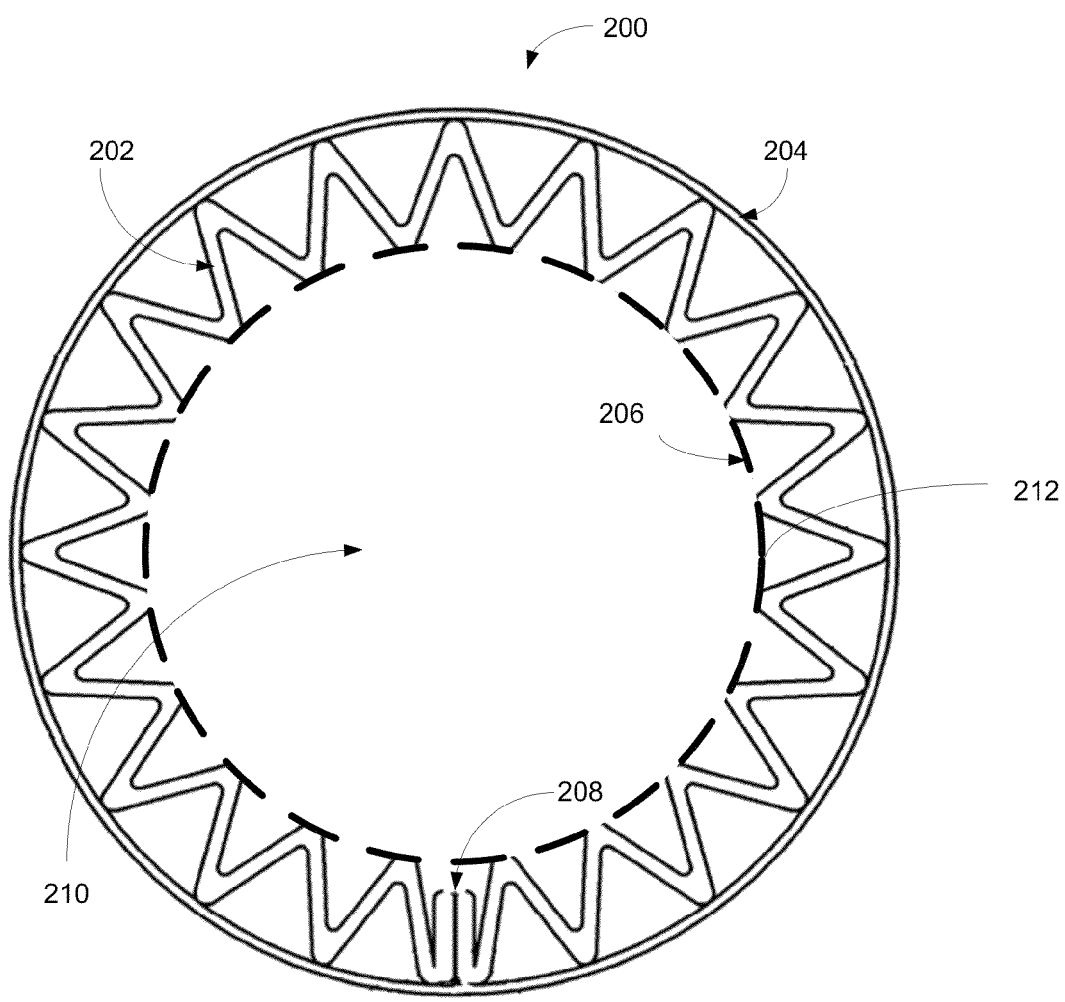
FIG. 2 is an illustration of a filter end view, according to an example embodiment of the invention.

FIG. 2 depicts a cross sectional view of a filter cartridge 200 (as in 102 of FIG. 1), according to an example embodiment of the invention. As indicated in this example embodiment, the filter cartridge 200 may include pleated filter material 202, outer support material 204, optional inner support material 206, filter material ends 208, and a filter aperture 210. According to an example embodiment, the outer support 204 may be extruded thermoplastic elastomer materials. According to another example embodiment, the outer support 204 may be expanded metal mesh. The inner support material 206 may be omitted, or may include perforated plastic or metal.

Figure 3:
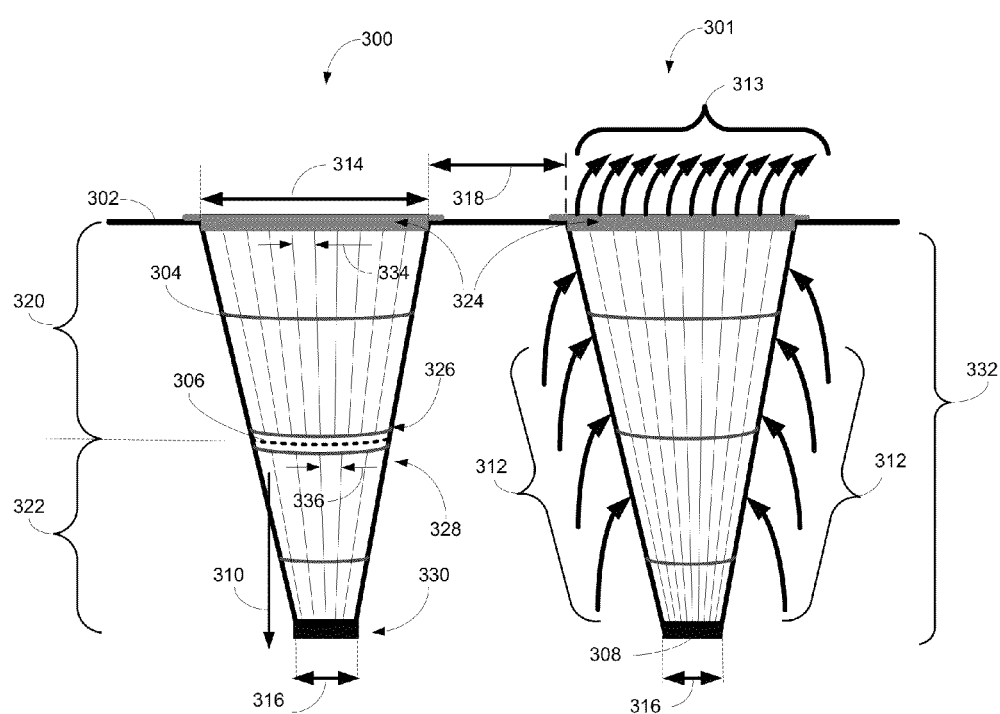
FIG. 3 is an illustration of filter cartridges, according to an example embodiment of the invention.

FIG. 3 depicts two filters 300, 301 attached to a baghouse tubesheet 302, according to example embodiments of the invention. The filter 300 shown on the left depicts a tapered 2-piece filter installation configuration, according to an example embodiment of the invention. The filter 301 shown on the right depicts a tapered 1-piece filter installation configuration, according to another example embodiment of the invention. According to example embodiments, the filters 300, 301 may include supports 304 for the pleated filter media. In an example embodiment, the tapered 1-piece filter installation configuration 301 can include an optional section-joining interface 306 for joining a first filter section 320 and a second filter section 322.

In example embodiments, the filters 300, 301 may include filter ends 308 with caps that prevent air from entering the ends 308. According to example embodiments of the invention, dust that becomes lodged on the filter media may be able to fall or be ejected by reverse pulsing from the tapered filters 300, 301. According to an example embodiment, dust may fall along a path 310 such that it does not re-attach to filter media, as may be the case for non-tapered filter cartridges.

According to example embodiments of the invention, the tapered filter shape may provide input air paths 312 to the filter media such that the velocity of the input air can be decreased. The reduced can velocity may be due to the additional volume provided between the filter cartridges because of the tapered filter shape. For example, as un-tapered filters are packed closer together in an array, the available free air volume around filtering media is reduced. Thus, for a given filtered air volume per unit time, the velocity of the air flowing through the available free space air paths increases as filters are packed closer together. However, by tapering the filters, additional volume of free air space may be made available between filters, and the velocity of the air flowing through the available free space air paths may be reduced. In an example embodiment, the filters 300, 301 may include an aperture near the first end 324. According to an example embodiment, dirty air or fluid may be filtered by the filter media and the resulting clean air or fluid 313 may pass through the aperture in the filter cartridge adjacent to a corresponding opening or aperture in the tubesheet 302. In an example embodiment, the filter aperture diameter 314 (at the first end 324 or wide end of the tapered filter) may be about 6.25 inches. In an example embodiment, the filter diameter at the end cap 316 may be about 4 inches. According to other example embodiments, the taper may provide about 50% reduction in cross sectional area from the wide end of the filter to the narrow end of the filter. In other example embodiments of the invention, the filter aperture diameter 314 may be other diameters, for example approximately: 6.25 inches, 6.1375 inches, 6 inches, 5.25 inches, 5 inches, or 4.625 inches, with the corresponding filter diameter at the end cap 316 providing about 50% reduction in cross sectional area from the wide end of the filter to the narrow end of the filter. In other example embodiments of the invention, the filter aperture diameter 314 may range from about 4 inches to about 12 inches.

According to example embodiments, the filters may be attached to the tubesheet 302 with an edge-to-edge spacing 318 ranging from about ½ inch to about 2 inches. In an example embodiment, the edge-to-edge spacing 318 may be set as small as possible, but large enough to allow removal and installation of the filters.

According to example embodiments, any filter with a cross sectional shape that provides a taper, including oval, square, etc., may be considered within the scope of embodiments of the invention.

According to example embodiments, the filters can be made with single filter sections 332 (as in 301) or with multiple filter sections 320, 322 (as in 300). For example, a filter 300 may include a first filter section 320 and a second filter section 322. In an example embodiment, the first filter section 320 may include a first end 324 and a first filter section second end 326. According to example embodiments, the second filter section 322 may include a second filter section first end 328 and a second filter section second end 330. In an example embodiment, the first filter section second end 326 may be joined with the second filter section first end 328 by an interface 306, such as one or more of a helical screw, a clamp, a gasket, adhesive, etc. According to example embodiments of the invention, the first filter section 320 may include a filter media having a linear pleat period 334 that may be the same or different than the linear pleat period 336 associated with the second filter section 322. According to example embodiments, the filter material may be cut into trapezoid shapes for forming a tapered cone-shaped filter.

Figure 4:
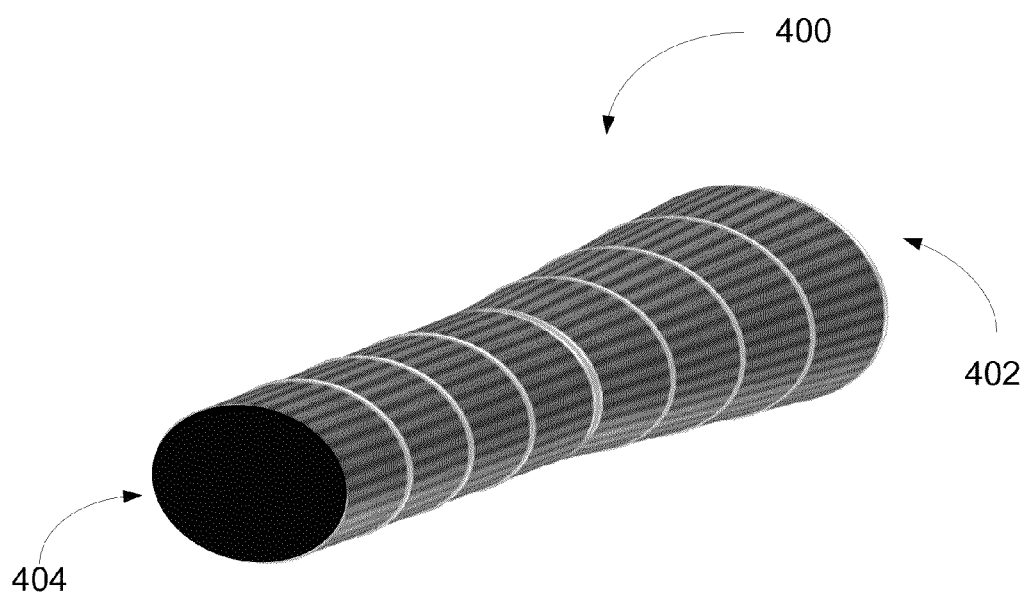
FIG. 4 is a plan view of a filter cartridge, according to an example embodiment of the invention.

FIG. 4 depicts a plan view of a tapered filter 400, according to an example embodiment of the invention. The filter 400 includes a first end 402 that is open (or includes an aperture). The filter 400 includes a second end 404 that may be closed, and may include an end cap.

Figure 5:
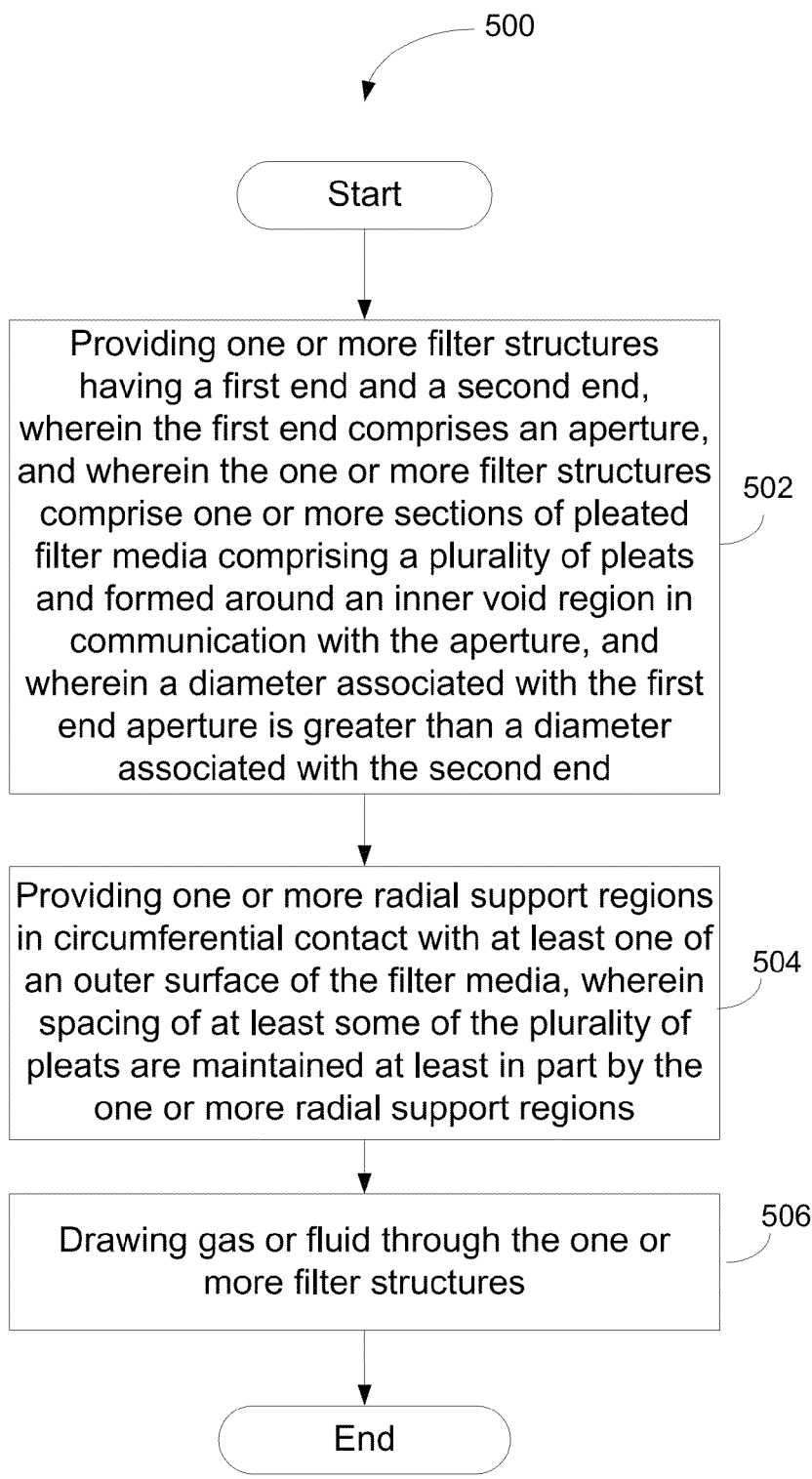
FIG. 5 is a flow diagram of an example method according to an example embodiment of the invention.

An example method 500 for filtering particles will now be described with reference to the flowchart of FIG. 5. The method 500 starts in block 502, and according to an example embodiment of the invention includes providing one or more filter structures having a first end and a second end, wherein the first end comprises an aperture, and wherein the one or more filter structures comprise one or more sections of pleated filter media comprising a plurality of pleats and formed around an inner void region in communication with the aperture, and wherein a diameter associated with the first end aperture is greater than a diameter associated with the second end. In block 504, and according to an example embodiment, the method 500 includes providing one or more radial support regions in circumferential contact with at least one of an outer surface of the filter media, wherein spacing of at least some of the plurality of pleats are maintained at least in part by the one or more radial support regions. In block 506, and according to an example embodiment, the method 500 includes drawing gas or fluid through the one or more filter structures. The method 500 ends after block 506.

Example embodiments further include maintaining structural support of the one or more sections 320, 322 of pleated filter media 202 with one or more radial support regions 304. Example embodiments include arranging the one or more filter structures 300, 301 with the first end 324 adjacent to a tubesheet 302, wherein the one or more filter structures 300, 301 are arranged with edge-to-edge spacing 318 greater than about 1 centimeter, where providing the one or more filter structures 300, 301 include joining a first filter section 320 and a second filter section 322. In example embodiments, joining the first filter section 320 and the second filter section 322 can include joining a first filter section 320 having pleated filter media 202 having a first uncompressed linear pleating period 334 with a second filter section 322 having pleated filter media 202 having a second uncompressed linear pleating period 336, wherein the first uncompressed linear pleating period 334 is smaller than the second uncompressed linear pleating period 336. Example embodiments may include removing one or more filtered particles 310 from a surface associated with the one or more filter structures 300, 301 by pulse cleaning, wherein at least some filtered particles fall in a vertical line.

According to example embodiment, providing the one or more filter structures 300, 301 comprises providing one or more sections 320, 322 of trapezoid-shaped pleated filter media 202 and forming the trapezoid-shaped pleated filter media 202 around an inner void region 210. Example embodiments, include providing the one or more filter structures 300, 301 and arranging the one or more filter structures 300, 301 which includes providing a second end spacing 319 between the one or more filter structures 300, 301 that is greater than a first end spacing 318 between the one or more filter structures 300, 301 to reduce can velocity. According to an example embodiment, providing the one or more filter structures and arranging the one or more filter structures comprises providing a second end spacing between the one or more filter structures that is greater than a first end spacing between the one or more filter structures.

Example embodiments of the invention include a filter having a first end 324 and a second end 308, wherein the first end 324 includes an aperture 212, and further includes one or more sections 320, 322 of pleated filter media 202 formed around an inner void region 210 in communication with the aperture 212, and wherein a diameter 314 associated with the first end aperture 212 is greater than a diameter 316 associated with the second end 308. Example embodiments of the filter further include one or more radial support regions 304 for maintaining structural support of the one or more sections 320, 322 of pleated filter media 202. Example embodiments include first filter section 320 joined with a second filter section 322. In example embodiments, the first filter section 320 includes pleated filter media 202 with a first uncompressed linear pleating period 334, and the second filter section 322 includes pleated filter media 202 with a second uncompressed linear pleating period 336. In an example embodiment, the first uncompressed linear pleating period 334 is smaller than the second uncompressed linear pleating period 336. According to an example embodiment, one or more sections 320, 322 include trapezoid-shaped pleated filter media, such as 202, formed around an inner void region 210. In an example embodiment, a diameter 314 associated with the first end aperture 212 is greater than a diameter 316 associated with the second end 308 to reduce can velocity.

Example embodiments may include a filtration system. The system can include a filter house 100 operable to receive a fluid or gas flow to be filtered, and a filter cartridge. The filter cartridge can include a first end 324 and a second end 308, wherein the first end 324 comprises an aperture 212, and further comprising one or more sections 320, 322 of pleated filter media 202 formed around an inner void region 210 in communication with the aperture 212, and wherein a diameter 314 associated with the first end aperture 212 is greater than a diameter 316 associated with the second end 308, and wherein the second end 308 further comprises at least one end cap with at least a portion of the filter media secured to the end cap. The filtration system can include one or more radial support regions 304 for maintaining structural support of the one or more sections 320, 322 of pleated filter media 202. In an example embodiment, the filtration system can include a first filter section 320 joined with a second filter section 322. In an example embodiment, the first filter section 320 can include pleated filter media 202 with a first uncompressed linear pleating period 334, and the second filter section 322 can include pleated filter media 202 with a second uncompressed linear pleating period 336. In an example embodiment, the first uncompressed linear pleating period 334 is smaller than the second uncompressed linear pleating period 336. In an example embodiment, the filtration system can include one or more sections 320, 322 that include trapezoid-shaped pleated filter media 202 formed around an inner void region 210. In an example embodiment, a diameter 314 associated with the first end aperture 212 is greater than a diameter 316 associated with the second end 308 to reduce can velocity. In an example embodiment, a diameter 314 associated with the first end aperture 212 is about 6 inches or greater, and wherein the diameter associated with the second end 308 is about 4 inches.

Example embodiments of the invention can include a filter for filtering particles from air or fluid. The filter includes a first end 324 and a second end 308, wherein the first end 324 comprises an aperture 212; one or more sections 320, 322 of pleated filter media 202 202 comprising a plurality of pleats formed in a substantially conical shape about an axis and around an inner void region 210 in communication with the aperture 212, wherein a diameter 314 associated with the first end 324 aperture 212 is greater than a diameter 316 associated with the second end 308; and one or more radial support regions 304 in circumferential contact with at least one of an outer surface of the filter media, wherein spacing of at least some of the plurality of pleats are maintained at least in part by the one or more radial support regions 304.

In an example embodiment, the one or more radial support regions 304 comprise an extruded the banding material comprising a thermoplastic polyester elastomer, wherein the banding material forms a substantially solid structure that fuses with one or more portions of the pleated filter media 202. In an example embodiment, at least some filtered particles in contact with an outer portion of the filter fall in a vertical line.

Example embodiments of the invention can include a filtration system. The filtration system includes a filter house 100 operable to receive a fluid or gas flow to be filtered; and a plurality of filter cartridges 106 comprising: a first end 324 and a second end 308, wherein the first end 324 comprises an aperture 212 and the second end 308 comprises an end cap 308; one or more sections 320, 322 of pleated filter media 202 202 comprising a plurality of pleats formed in a substantially conical shape about an axis and around an inner void region 210 in communication with the aperture 212, wherein a diameter 314 associated with the first end 324 aperture 212 is greater than a diameter 316 associated with the second end 308, and wherein the filter media is secured to the end cap 308; and one or more radial support regions 304 in circumferential contact with at least one of an outer surface of the filter media 202, wherein spacing 334, 336 of at least some of the plurality of pleats are maintained at least in part by the one or more radial support regions 304.

In an example embodiment, the one or more radial support regions 304 comprise an extruded the banding material comprising a thermoplastic polyester elastomer, wherein the banding material forms a substantially solid structure that fuses with one or more portions of the pleated filter media 202. In an example embodiment, the filter cartridges comprise a first filter section 320 joined with a second filter section 322. In an example embodiment, first filter section 320 comprises pleated filter media 202 with a first uncompressed linear pleating period 334, and wherein the second filter section 322 comprises pleated filter media 202 with a second uncompressed linear pleating period 336, wherein the first uncompressed linear pleating period 334 is smaller than the second uncompressed linear pleating period 336. In an example embodiment, the distance between first end apertures of the plurality of filter cartridges is less than a distance between the second ends.

According to example embodiments, certain technical effects can be provided, such as creating certain systems, methods, and apparatus that provide filters that may be made with a tapered shape to help provide a larger volume between filter cartridges to reduce air velocities (or can velocities) around the cartridges. Example embodiments of the invention can provide the further technical effects of providing systems, methods, and apparatus for allowing air to interact evenly with the filter material. Example embodiments of the invention can provide the further technical effects of providing systems, methods, and apparatus for cleaning filters efficiently.

In example embodiments of the invention, the tapered 2-piece filter configuration 300 and the tapered 1-piece filter configuration 301 may include any number of hardware necessary to facilitate any of the operations described. As desired, embodiments of the invention may include the tapered filters with more or less components than shown in FIGS. 2-4.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A filter for filtering particles from air or fluid, the filter comprising:
    a first end and a second end, wherein the first end comprises an aperture;
    one or more sections of pleated filter media comprising a plurality of pleats formed in a substantially conical shape about an axis and around an inner void region in communication with the aperture, wherein a diameter associated with the first end aperture is greater than a diameter associated with the second end; and
    one or more radial support regions in circumferential contact with at least one of an outer surface of the filter media, wherein spacing of at least some of the plurality of pleats are maintained at least in part by the one or more radial support regions;
    wherein the one or more sections of pleated filter media comprises a first filter section joined with a second filter section, wherein the first filter section comprises pleated filter media with a first uncompressed linear pleating period, and wherein the second filter section comprises pleated filter media with a second uncompressed linear pleating period, wherein the first uncompressed linear pleating period is smaller than the second uncompressed linear pleating period.

2. The filter of claim 1, wherein the one or more radial support regions comprise an extruded the banding material comprising a thermoplastic polyester elastomer, wherein the banding material forms a substantially solid structure that fuses with one or more portions of the pleated filter media.

3. The filter of claim 1, wherein the one or more sections comprises trapezoid-shaped pleated filter media formed around the inner void region.

4. The filter of claim 1, wherein at least some filtered particles in contact with an outer portion of the filter fall in a vertical line.

5. A filtration system comprising:
    a filter house operable to receive a fluid or gas flow to be filtered; and
    a plurality of filter cartridges comprising:
        a first end and a second end, wherein the first end comprises an aperture and the second end comprises an end cap;
        one or more sections of pleated filter media comprising a plurality of pleats formed in a substantially conical shape about an axis and around an inner void region in communication with the aperture, wherein a diameter associated with the first end aperture is greater than a diameter associated with the second end, and wherein the filter media is secured to the end cap; and
        one or more radial support regions in circumferential contact with at least one of an outer surface of the filter media, wherein spacing of at least some of the plurality of pleats are maintained at least in part by the one or more radial support regions,
    wherein the one or more sections of pleated filter media comprises a first filter section joined with a second filter section, wherein the first filter section comprises pleated filter media with a first uncompressed linear pleating period, and wherein the second filter section comprises pleated filter media with a second uncompressed linear pleating period, wherein the first uncompressed linear pleating period is smaller than the second uncompressed linear pleating period.

6. The filtration system of claim 5, wherein the one or more radial support regions comprise an extruded the banding material comprising a thermoplastic polyester elastomer, wherein the banding material forms a substantially solid structure that fuses with one or more portions of the pleated filter material.

7. The filtration system of claim 5, wherein the one or more sections comprises trapezoid-shaped pleated filter media formed around the inner void region.

8. The filtration system of claim 5, wherein a distance between first end apertures of the plurality of filter cartridges is less than a distance between the second ends.

9. The filtration system of claim 5, wherein the diameter associated with the first end aperture is about 6 inches or greater, and wherein the diameter associated with the second end is about 4 inches.

10. A method for filtering particles, the method comprising:
   providing one or more filters as defined in claim 1; and
   drawing gas or fluid through the one or more filter structures.

11. The method of claim 10, further comprising maintaining structural support of the one or more sections of pleated filter media with one or more radial support regions comprising an extruded the banding material, wherein the banding material forms a substantially solid structure that fuses with one or more portions of the pleated filter material.

12. The method of claim 10, further comprising:
   arranging the one or more filters with the first end adjacent to a tubesheet, wherein the one or more filter structures are arranged with edge-to-edge spacing greater than about 1 centimeter,
   wherein providing the one or more filters comprises joining a first filter section and a second filter section.

13. The method of claim 12, wherein joining the first filter section and the second filter section comprises joining a first filter section having pleated filter media comprising a first uncompressed linear pleating period with a second filter section having pleated filter media comprising a second uncompressed linear pleating period, wherein the first uncompressed linear pleating period is smaller than the second uncompressed linear pleating period.

14. The method of claim 10, further comprising removing one or more filtered particles from a surface associated with the one or more filters by pulse cleaning, wherein at least some filtered particles fall in a vertical line.

15. The method of claim 10, wherein providing the one or more filters comprises providing one or more sections of trapezoid-shaped pleated filter media and forming the trapezoid-shaped pleated filter media around an inner void region.

16. The method of claim 10, wherein providing the one or more filters and arranging the one or more filters comprises providing a second end spacing between the one or more filter structures that is greater than a first end spacing between the one or more filters.

* * * * *